United States Patent [19]
Lamoria et al.

[11] 3,879,909
[45] Apr. 29, 1975

[54] PROCESS FOR ACCELERATING CURE AND ENHANCING ULTIMATE STRENGTH OF PREFABRICATED MASONRY STRUCTURES

[75] Inventors: Lz F. Lamoria, Bay City; Dallas G. Grenley, Midland, both of Mich.

[73] Assignee: The Dow Chemical Company, Midland, Mich.

[22] Filed: June 12, 1974

[21] Appl. No.: 478,479

[52] U.S. Cl. .................. 52/309; 52/747; 260/29.6 S
[51] Int. Cl. ............................................. E04b 2/04
[58] Field of Search ............ 52/309, 741, 744, 747; 260/29.6 S, 29.7 S

[56] References Cited
UNITED STATES PATENTS
3,297,613  1/1967  Gibbs............................ 260/29.6 S FOREIGN PATENTS OR APPLICATIONS
967,587   8/1964   United Kingdom ............ 260/29.6 S

*Primary Examiner*—John E. Murtagh
*Attorney, Agent, or Firm*—Ronald G. Brookens

[57] ABSTRACT

A process for accelerating the cure and enhancing the ultimate strength of prefabricated masonry structures prepared using latex modified portland cement mortar comprising (1) utilizing a portland cement mortar containing modifying amounts of a vinylidene chloride polymer latex and (2) substantially uniformly heating the non-cured prefabricated masonry structure to temperatures of from about 110° to about 210°F under less than about 80 percent relative humidity for a period of at least about 4 hours.

4 Claims, No Drawings

PROCESS FOR ACCELERATING CURE AND ENHANCING ULTIMATE STRENGTH OF PREFABRICATED MASONRY STRUCTURES

BACKGROUND OF THE INVENTION

Although non-latex modified portland cement mortar systems have adequate properties for a number of construction applications, such mortar has not been successfully used in the preparation of prefabricated masonry structures, particularly load bearing wall structures composed of a single course of bricks joined together with non-latex modified portland cement mortar. This is due to the inability of such mortar to provide a masonry structure having a flexural strength of at least about 150 psi, which strength is necesarry for normal handling procedures.

Latex modified portland cement mortar system have been developed, however, which have radically changed the physical properties of unmodified portland cement mortars.

Of the latex-modified systems the addition of vinylidene chloride polymer latexes to portland cement mortar have provided exceptionally high strength thereby permitting, for the first time, the construction of load bearing brick walls and curtain walls composed of a single wythe of bricks joined by the specified latex-modified cement mortar. Further, and most importantly, such material maintains this high strength when the cured compositions are subjected to a wet environment.

British Pat. No. 967,587 is directed to such vinylidene chloride polymer latex-modified portland cement mortars and serves to illustrate the unique characteristics of such mortars as contrasted with other latex-modified cement mortar compositions such as polyvinyl acetate latex-modified mortars.

The high strength mortars made through modification with latex, have been found to cure at about the same rate as conventional portland cement mortars. Further, it has been found that, under ambient weather conditions, a prefabricated masonry panel prepared using vinylidene chloride polymer latex-modified portland cement mortar, does not have sufficient strength to be handled until it has aged for a period of from 6 to 15 days or more if low temperatures are encountered, i.e., until a flexural strength of from about 150 to 250 psi is obtained, and that about 28 days are required for the mortar to achieve over 95 percent of its ultimate strength. By way of contrast, prefabricated masonry panels prepared from non-latex modified portland cement mortars will never achieve such minimum strength.

It is an object of the present invention to accelerate such cure so that the masonry structure may be conventionally handled within a period of from as short as from about 12 to 24 hours after construction.

Accelerated cure of precast concrete has been accomplished with steam. It has been discovered, however, that subjecting masonry structures containing vinylidene chloride polymer latex modified portland cement mortar to steam treatment (although accelerating the rate of cure), is detrimental to the obtainment of optimum strength of the masonry structure.

It has now been discovered, which discovery represents a part of the present invention, that subjecting substantially non-cured prefabricated masonry structures prepared using vinylidene chloride polymer latex modified portland cement mortar, as prescribed by the present invention, to temperatures of from about 110° to about 210°F under less than about 80 percent relative humidity for a period of at least about 4 hours, will significantly increase the rate of cure and unexpectedly provide for significantly greater ultimate strength in the masonry structure. This result is particularly unexpected as it is well known in the art that accelerated curing of non-latex modified mortar compositions with substantially dry heat results in significant cracking of the mortar.

SUMMARY OF THE INVENTION

The above and related desirable objects and results are obtained by a process for preparing prefabricated masonry structures wherein such process comprises (1) utilizing as the mortar in such structures a portland cement mortar containing a vinylidene chloride polymer latex in an amount sufficient to provide from about 5 to about 20 percent by weight of latex solids based on the weight of mortar and (2) substantially uniformly heating the non-cured prefabricated structure to temperatures of from about 110° to about 210°F under less than about 80 percent relative humidity for a period of at least about 4 hours.

DESCRIPTION OF PREFERRED EMBODIMENTS

By the expression "prefabricated masonry structures" is meant any structure prepared from brick, cement block or tile using a cement mortar as a bonding material. Particularly useful structures are the load bearing external brick walls composed of a single wythe of bricks joined by the specified latex-modified cement mortar. Conventionally, the mortar joints in such structures are from about one-eighth inch to about five-eighths inch in thickness.

By the term "vinylidene chloride polymer latex" as used herein is meant any aqueous colloidal dispersion of an organic interpolymer which interpolymer is composed of from about 35 to about 90 parts by weight of vinylidene chloride and from about 65 to about 10 parts by weight of at least one other interpolymerized material of the general formula:

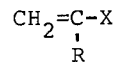

wherein R is selected from the group consisting of hydrogen and the methyl group and X is selected from the group consisting of —CN, halogens of atomic numbers 9 to 35, and ester-forming groups, —COOY, wherein Y is selected from the group consisting of a primary alkyl group and a secondary alkyl group, each of the foregoing alkyl groups containing from 1 to 18 carbon atoms inclusively.

Exemplary of such interpolymerizable monomeric materials are: methyl acrylate, ethyl acrylate, propyl acrylate, ispropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, octadecenyl acrylate, methyl methacrylate, ethyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butoxyethyl acrylate or methacrylate or other alkoxyethyl acrylates or methacrylates, vinyl halides (e.g., vinyl chloride, vinyl bromide, etc.), acrylonitrile, methacrylonitrile, and the like.

Representative types of water-insoluble vinylidene chloride polymers which have been discovered to be highly satisfactory as the latex components employed in the superior latex-modified portland cement mortar compositions of the present invention include those interpolymers designated in the following Table I:

It is to be understood that the method of the present invention is applicable to any conventionally used portland cement mortar system.

It has further been discovered, which discovery is a part of the present invention, that the portland cement mortar systems described herein can be cured immediately upon addition of the polymeric latex modifier and that controlling of the rate of temperature increase is unnecessary. Further, the temperatures used and the duration of exposure to such temperature will depend

TABLE I

Vinylidene Chloride Interpolymer Compositions

| Organic Monomer Components | Parts by Weight | | | | | | | | | | | |
| --- | --- | --- | --- | --- | --- | --- | --- | --- | --- | --- | --- | --- |
| Vinylidene Chloride | 40 | 60 | 89 | 90 | 50 | 88 | 50 | 52 | 70 | 75 | 75 | 75 |
| Vinyl Chloride | | | | | | | 40 | 35 | 20 | 20 | 20 | 20 |
| Ethyl Acrylate | 60 | 40 | | | 40 | 7 | 10 | | 10 | 5 | | 5 |
| Methyl Methacrylate | | | | 10 | 10 | | | | | | | 2 |
| 2-Ethylhexyl Acrylate | | | | | | | | 13 | | | | |
| Acrylonitrile | | | 11 | | | 5 | | | | 5 | | |

Of particular benefit in the preparation of the exceptionally strong, latex-modified portland cement mortar compositions of the present invention is the interpolymer latex, containing about 75 parts by weight of interpolymerized vinylidene chloride, about 20 parts by weight of interpolymerized vinyl chloride, about 5 parts by weight of interpolymerized ethyl acrylate, and about 2 parts by weight of interpolymerized methyl methacrylate.

The present invention specifically contemplates latex-modified portland cement mortar compositions which comprise, on a volume basis calculated as the volume displaced when the ingredient is immersed in water, a. about 100 volumes of portland cement
b. between about 200 and 10,000 volumes of a mineral aggregate,
c. between about 40 and 170 volumes of water,
d. between about 8 and 40 volumes of polymer solids of an aqueous dispersion of organic interpolymer latex, and
e. up to about 160 volumes of a workability agent composed of a natural carbonate consisting of the minerals calcite, dolomite and magnesite which may comprise a continuous gradation from calcium carbonate through calcium magnesium carbonate to magnesium carbonate wherein the workability agent has an average particle size capable of passing a 200 mesh screen (U.S. Standard Sieve Series), i.e., wherein at least 50 percent of the particulate workability agent passes through a 200 mesh screen.

The cement referred to may be selected from the group of inorganic settable materials, such as hydraulic, portland, natural, or aluminous cement.

The mineral aggregate used may be stone, gravel, pebbles, granite, carborundum, aluminum oxide, emery, marble chips, cinders or other aggregate commonly employed in cement mortars. The intended end use of the cement system can undoubtedly serve as a guide to those skilled in the art as to the choice of preferred particle size of the aggregate material to be used.

somewhat upon the cement system employed. In any event, exposure to heat at temperatures in the range of from about 110° to 210°F, under relative humidity of less than about 80 percent for a period of about 4 hours is generally required, with temperatures of from about 140° to about 170°F and a relative humidity of less than about 50 percent being generally preferred.

The following specific examples further illustrate the present invention.

EXAMPLE 1 — PORTLAND CEMENT MORTAR Systems

The following general formulation was used to prepare a series of individual cement mortar systems.

FORMULATION

| Material | Pounds | |
| --- | --- | --- |
| Huron Type I portland cement | 94 | |
| Workability Agent | 50 | |
| Mason sand | 280 | |
| Interpolymer latex (containing 50% solids having a composition of 75 pts. by wt. vinylidene chloride/ 20 pts. by wt. vinyl chloride/ 5 pts. by wt. ethyl acrylate/ 3 pts. by wt. methyl methacrylate) .4 wt. % silicone antifoamer 6 wt. % nonionic surfactant | 41 | (when used) |

In each instance, the sand and portland cement were first thoroughly mixed and, in those instances where used, the interpolymer latex added thereto. The entire formulation was then mixed in a conventional paddle-type mortar mixer until an even consistency resulted (about 4 to 5 minutes).

A series of experiments was then conducted wherein individual portions of the above portland cement mortar composition were utilized as a mortar in the preparation of individual brick columns (7 bricks high). The mortar was cured under varying conditions of time and temperature, and the masonry structures tested for flexural strength as determined by ultimate modules of rupture in bending by third point loading (ASTM Test No. C-78-64). The brick used had an absorption of 16-28 g. of $H_2O$/30 in.$^2$ as determined by ASTM No. C67-62. The following Table II sets forth data obtained.

TABLE II

Flexural Strength of Masonry Structures

| Sample No. | Latex-Modified Mortar | Cure Conditions | | | Flexural Strength (psi) |
| --- | --- | --- | --- | --- | --- |
| | | Temp. (°F) | Time (days) | Relative Humidity (%) | |
| Series I | | | | | |
| For Comparison | | | | | |
| 1 | No | 73 | 1 | 30–50 | <20 |
| 2 | No | 73 | 1 | 100 | 20–30 |
| 3 | No | 73 | 28 | 30–50 | 50–90 |
| 4 | No | 110 | 1 | 30–50 | <20 |
| 5 | No | 210 | 1 | 30–50 | <20 |
| Series II | | | | | |
| For Comparison | | | | | |
| 6 | Yes | 73 | 1 | 30–50 | 50–60 |
| 7 | Yes | 73 | 1 | 100 | >50 |
| 8 | Yes | 73 | 28 | 30–50 | 425 |
| Series III | | | | | |
| The Invention | | | | | |
| 9 | Yes | 110 | 1/6 (4 hrs) | 30–50 | 170–180 |
| 10 | Yes | 170 | 1/6 (4 hrs) | 30–50 | 170–180 |
| 11 | Yes | 210 | 1/6 (4 hrs) | 30–50 | 170–180 |
| 12 | Yes | 110 | ½ (12 hrs) | 30–50 | 220–230 |
| 13 | Yes | 110 | 1 day | 30–50 | 300 |
| 14 | Yes | 110 | 28 days | 30–50 | >500 |

The above data illustrate that the masonry structure prepared using the non-latex modified cement mortar (Series I) was incapable of achieving a flexural strength of at least 150 psi, which strength is considered in the industry as being the minimum requirements for successfully handling prefabricated wall structures. Sample No. 2 (of Series I) illustrates that the use of a high humidity slightly accelerates the rate of cure of the masonry structures prepared from the non-latex modified portland cement mortar.

The data set forth in Series II of Table II above illustrate that curing masonry structures containing the latex-modified cement mortar, as required by the present invention, but using temperatures less than 110°F (Sample No. 6), fails to provide the required minimum flexural strength, and that the use of a high humidity air actually decreases the flexural strength obtained (Sample No. 7).

Further, by way of contrast, the data set forth in Series III (of Table II) illustrates that utilization of the process of the present invention provides the required minimum flexural strength over a cure time of as little as 4 hours (Sample No. 9); and that such process provides a significantly increased "optimum strength" using the conventional 28 day standard (Sample No. 14), as compared to that achieved using cure temperatures of less than 110°F (Sample No. 8 of Series II).

What is claimed is:

1. A process for accelerating the cure and enhancing the ultimate strength of prefabricated masonry structures wherein such process comprises (1) utilizing as the mortar in such structures a portland cement mortar containing a vinylidene chloride polymer latex in an amount sufficient to provide from about 5 to about 20 percent by weight of polymer solids based on the weight of mortar and (2) substantially uniformly heating the non-cured prefabricated masonry structure to temperatures of from about 110° to about 210°F under less than about 80 percent relative humidity for a period of at least about 2 hours.

2. The process of claim 1 wherein said vinylidene chloride polymer is composed of from about 35 to about 90 parts by weight of vinylidene chloride and from about 65 to 10 parts by weight of at least one other interpolymerizable material of the general formula:

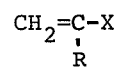

wherein R is selected from the group consisting of hydrogen and the methyl group and X is selected from the group consisting of —CN, halogens of atomic numbers 9 to 35, and ester forming groups, —COOY, wherein Y is selected from the group consisting of a primary alkyl group and a secondary alkyl group, each of the foregoing alkyl groups containing from 1 to 18 carbon atoms inclusively.

3. The process of claim 2 wherein said vinylidene chloride polymer is composed of about 75 parts by weight of vinylidene chloride, about 5 parts by weight of ethyl acrylate, about 2 parts by weight of methyl methacrylate and about 20 parts by weight of vinyl chloride.

4. A substantially crack-free prefabricated masonry structure prepared by the process of claim 1.

* * * * *